United States Patent [19]

Narayan

[11] Patent Number: 4,525,489

[45] Date of Patent: Jun. 25, 1985

[54] PHOSPHONIUM CARBOXYLATE CATALYSTS FOR THE PREPARATION OF FOAMS CHARACTERIZED BY ISOCYANURATE, AND/OR URETHANE LINKAGES

[75] Inventor: Thirumurti Narayan, Grosse Ile, Mich.

[73] Assignee: BASF Wyandotte Corporation, Wyandotte, Mich.

[21] Appl. No.: 297,244

[22] Filed: Aug. 28, 1981

Related U.S. Application Data

[62] Division of Ser. No. 200,508, Oct. 24, 1980, abandoned.

[51] Int. Cl.$^3$ ............................................. C08G 18/14
[52] U.S. Cl. .................................. 521/108; 521/168; 521/902
[58] Field of Search ...................... 521/108, 168, 902

[56] References Cited

U.S. PATENT DOCUMENTS

| | | | |
|---|---|---|---|
| 2,937,207 | 5/1960 | Reuter et al. | 260/606.5 |
| 3,206,552 | 9/1965 | Gollis et al. | 521/902 |
| 3,211,704 | 10/1965 | Gilman et al. | 521/902 |
| 3,313,747 | 4/1967 | Schramm | 521/161 |
| 4,066,580 | 1/1978 | Falkenstein et al. | 521/902 |
| 4,148,980 | 4/1979 | Narayan | 521/902 |
| 4,359,541 | 11/1982 | Patton et al. | 521/902 |

OTHER PUBLICATIONS

Reference Book of Inorganic Chemistry, Latimer & Hildebrand, p. 218.

Primary Examiner—Maurice J. Welsh
Assistant Examiner—Garnette D. Draper
Attorney, Agent, or Firm—Joseph D. Michaels

[57] ABSTRACT

Reaction products of certain tertiary phosphines, alkylene oxides, and carboxylic acids have been found to be effective catalysts for the preparation of rigid and flexible foams characterized by isocyanurate and/or urethane linkages.

12 Claims, No Drawings

PHOSPHONIUM CARBOXYLATE CATALYSTS FOR THE PREPARATION OF FOAMS CHARACTERIZED BY ISOCYANURATE, AND/OR URETHANE LINKAGES

CROSS REFERENCE TO RELATED APPLICATION

This application is a division of applicant's copending application, Ser. No. 200,508, filed Oct. 28, 1980, now abandoned.

BACKGROUND OF THE INVENTION

1. Field of the Invention

The present invention pertains to compositions of matter and particularly to the reaction products of certain tertiary phosphines, alkylene oxides and carboxylic acids. More particularly, the present invention concerns the use of these compounds in the preparation of rigid and flexible foams characterized by isocyanurate and/or urethane linkages.

2. Description of the Prior Art

Rigid and flexible foams characterized by isocyanurate and/or urethane linkages are known in the art. The prior art discloses methods for preparing foams by reacting an organic polyisocyanate with a polyol utilizing a catalyst. Foams are prepared by effecting such reaction in the presence of a blowing agent.

U.S. Pat. No. 4,021,381 teaches that, among other things, phosphines can be used as catalysts in the preparation of polyurethane foams. These catalysts, however, are not suitable for lower density foam preparation. U.S. Pat. No. 4,148,980 teaches that the reaction products of tertiary amines, alkylene oxides, and carboxylic acids can be used as catalysts in the preparation of rigid and flexible foams characterized by isocyanurate and/or urethane linkages. These catalysts, however, are not suitable for pour-in-place rigid foam applications because they cause the reaction to proceed too quickly.

SUMMARY OF THE INVENTION

Applicant has found that the reaction products of certain tertiary phosphines, alkylene oxides, and carboxylic acids are effective catalysts in the preparation of rigid and flexible foams characterized by isocyanurate and/or urethane linkages. They provide reaction times which make them particularly suitable for pour-in-place rigid foam preparation. Based on spectroscopic analysis, the reaction products are believed to be phosphonium carboxylates which are described by one of the following structural formulae, depending upon the tertiary phosphine used to prepare the catalyst:

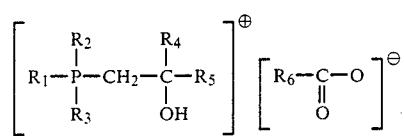

wherein (a) $R_1$, $R_2$ and $R_3$ are radicals individually selected from the group consisting of alkyl and hydroxyalkyl radicals having 1 carbon atom to 5 carbon atoms, aryl radicals having 6 carbon atoms to 14 carbon atoms, arylakyl radicals having 7 carbon atoms to 16 carbon atoms, and cycloalkyl radicals having 3 carbon atoms to 6 carbon atoms;

(b) $R_4$ and $R_5$ are radicals individually selected from the group consisting of hydrogen, alkyl radicals having 1 carbon atom to 5 carbon atoms, aryl radicals having 6 carbon atoms to 14 carbon atoms, arylalkyl radicals having 7 carbon atoms to 16 carbon atoms, and cycloalkyl radicals having 3 carbon atoms to 6 carbon atoms;

(c) $R_6$ is a radical selected from the group consisting of hydrogen and alkyl radicals having 1 carbon atom to 10 carbon atoms,

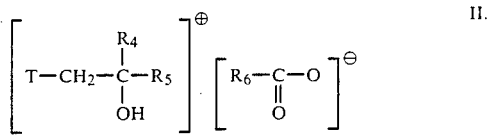

wherein (a) T is a phosphine radical derived from a tertiary phosphine selected from the group consisting of mono and bicyclic tertiary phosphines having 4 carbon atoms to 10 carbon atoms;

(b) $R_4$ and $R_5$ are radicals individually selected from the group consisting of hydrogen, alkyl radicals having 1 carbon atom to 5 carbon atoms, aryl radicals having 6 carbon atoms to 14 carbon atoms, and cycloalkyl radicals having 3 carbon atoms to 6 carbon atoms; and (c) $R_6$ is a radical selected from the group consisting of hydrogen and alkyl radicals having 1 carbon atom to 10 carbon atoms.

DESCRIPTION OF THE PREFERRED EMBODIMENTS

The catalyst compositions of this invention, which are useful in the preparation of rigid and flexible foams characterized by isocyanurate and/or urethane linkages, are prepared by reacting a tertiary phosphine, alkylene oxide, and a carboxylic acid in a ratio of 0.75 mole to 1.25 moles alkylene oxide to 0.75 equivalent to 1.25 equivalents of acid per equivalent of phosphorus.

The tertiary phosphines which are employed in the preparation of the catalysts of the present invention contain three radicals bonded to the phosphorus atom. The radicals are individually selected from the group consisting of alkyl and hydroxyalkyl radicals containing 1 carbon atom to 6 carbon atoms, aryl radicals containing 6 carbon atoms to 14 carbon atoms, arylalkyl radicals containing 7 carbon atoms to 16 carbon atoms, and cycloalkyl radicals having 3 carbon atoms to 6 carbon atoms. Phosphine radicals derived from mono- or bicyclic tertiary phosphines having 4 carbon atoms to 10 carbon atoms may also be used to prepare the catalysts of the present invention.

Representative examples of tertiary phosphines which can be employed in making the catalysts of this invention are trimethylphosphine, triethylphosphine, tripropylphosphine, tributylphosphine, triphenylphosphine, 1-methyl-2-phospholene, 1-methyl-3-phospholene, 1-phenyl-3-phospholene, 1-methylphosphorinane, 1-ethylphosphorinane, 1-phenylphosphorinane, 1-methylphosphole, 1-methyl-4-oxa-phosphorinane, triethylenediphosphine, 1-phenylphospholane, and 1-phenyldihydrophosphorin.

The alkylene oxides which can be employed in making the catalysts of this invention are those which contains 2 to 18 carbon atoms, and include ethylene oxide, propylene oxide, 1,2-butylene oxide, pentene oxide, styrene oxide, phenylglycidyl ether, butadiene oxide, glycidyl ethers of novolaks, and glycidyl ethers of aliphatic alcohols. Preferred are ethylene oxide, propylene oxide, and diglycidyl ether of bisphenol A.

The acids which may be employed in making the catalysts of this invention are alkyl acids containing from 1 to 18 carbon atoms and aryl acids having 7 to 14 carbon atoms, arylalkyl and alkylaryl acids having 8 to 16 carbon atoms and heterocyclic carboxylic acids containing 6 to 10 carbon atoms. Representative acids include aliphatic acids such as 2-ethylhexanoic acid, formic acid, acetic acid, butanoic acid, pentanoic acid, nananoic acid; N,N-dimethylaminoacetic acid, acetoacetic acid, pyruvic acid, cyclopropanecarboxylic acid, cyclobutanecarboxylic acid, cyclopentanecarboxylic acid, cyclohexanecarboxylic acid; unsaturated acids such as acrylic acid, methylacrylic acid, furylacrylic acid; acids having electron withdrawing groups such as mono, di and trichloroacetic acids, cyanoacetic acid; aryl acids such as benzoic acid, naphthoic acid, diphenylcarboxylic acid; alkylaryl acids such as ortho- and para- toluic acids; N,N-dimethylaminobenzoic acid, methylnaphthoic acid; arylalkyl acids such as phenylacetic acid, cinnamic acid, phenyl propionic acid and heterocyclic acids such as furancarboxylic acid, thiophenecarboxylic acid, pyridinecarboxylic acid, pyrazinecarboxylic acid.

The general procedure employed for the preparation of the catalysts will now be described. The desired amount of tertiary phosphine and solvent, if used, is added to a reaction vessel. Alkylene oxide is then added dropwise. If any exotherm occurs, the reaction mixture is allowed to reach a maximum temperature. The carboxylic acid is then added in small increments. After the addition has been completed, the reaction temperature is increased to 80° C. and maintained at that temperature for a period of from 5 minutes to 5 hours, preferably from 30 minutes to 2 hours. The reaction temperature may range from 10° C. to 200° C., preferably from 20° C. to 150° C. The resulting products are then employed as catalysts.

The catalysts of the present invention are used to prepare foams with isocyanurate and/or urethane linkages. Foams with isocyanurate linkages are prepared by mixing an organic polyisocyanate, a catalyst prepared in accordance with the present invention, and a blowing agent at initiating temperatures ranging from 0° C. to 150° C. In the event that foams with urethane and/or isocyanurate linkages are desired, these are prepared by mixing an organic polyisocyanate with a compound having at least two active hydrogen atoms as determined by the well-known Zerewitinoff test as described in Kohler, *Journal of the American Chemical Society*, Vol. 49, p. 3181 (1927). These compounds and their methods of preparation are well known in the art. Foams with isocyanurate and/or urethane linkages are prepared by reacting 0.01 equivalent to 0.8 equivalent of a compound having at least two active hydrogen atoms with one equivalent of polyisocyanate. The compound containing the active hydrogens has a functionality of 2 to 8 and an average hydroxyl number equivalent weight of 31 to 500. Polyurethane foams are prepared by reacting the compound containing the active hydrogens and polyisocyanate on an essentially 1:1 equivalent basis. Quasi-prepolymers may also be employed in the process of the subject invention. The quasi-prepolymers are prepared by reacting the polyisocyanate with a minor amount of the compound containing the active hydrogens. The amount of catalyst used, which has been prepared in accordance with the present invention, is from 0.1 percent to 10 percent based on the weight of organic polyisocyanate.

The organic polyisocyanates used in the preparation of the foams in the process of the subject invention correspond to the formula:

$$R''(NCO)_z$$

wherein R" is a polyvalent organic radical which is either aliphatic, arylalkyl, alkylaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; aromatic triisocyanates such as 4,4',4"-triphenylmethane triisocyanate, 2,4,6-toluene triisocyanates; aromatic tetraisocyanates such as 4,4'-dimethyldiphenylmethane-2,2',5,5=-tetraisocyanate, and the like; arylalkyl polyisocyanates, such as α,α-xylene diisocyanate; aliphatic polyisocyanates, such as hexamethylenediisocyanate, lysine diisocyanate methylester and the like; and mixtures thereof. Other organic polyisocyanates include polymethylene polyphenylisocyanate, hydrogenated methylene diphenyldiisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

The use of any one specific active hydrogen compound is not critical hereto, rather any such compound can be employed herein to react with the polyisocyanate. Suitable active hydrogen-containing functional groups, as determined by the Zerwitinoff method, which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyoxyalkylene polyether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic, and heterocyclic diamines as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth the above, or they may be made using the same components that make up the hydroxy-terminated polyester with only a portion of the components being a diamine such as ethylenediamine.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyoxyalkylene polyether polyols may be prepared from other starting materials such as tetrahydrofuran and alkylene oxidetetrahydrofuran copolymers; epihalohydrins such as epichlorohydrin; as well as arylalkylene oxides such as styrene oxide. The polyoxyalkylene polyether polyols may have either primary or secondary hydroxyl groups and, preferably, are polyethers prepared from alkylene oxides having from two to six carbon atoms such as polyoxyethylene ether glycols, polyoxypropylene ether glycols, and polyoxybutylene ether glycols. The polyoxyalkylene polyether polyols may be prepared by any known process such as, for example, the process disclosed by Wurtz in 1859, or in *Encyclopedia of Chemical Technology*, Vol. 7, pp. 257–262, (Interscience Publishers, Inc., 1951), or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyoxyalkylene polyether polyols. Acids of phosphorus which may be used are acids having a P₂O₅ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diamino-toluene; aliphatic polyamines such as ethylenediamine, 1,3-propylenediamine; 1,4-butylenediamine, and 1,3-butylene-diamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C. The reactive polyol medium generally has a molecular weight of at least about 500 and a hydroxyl number ranging from about 30 to about 600. The graft polyol has a molecular weight of at least about 1500 and a viscosity of less than 40,000 cps. at 10 percent polymer concentration. A more comprehensive discussion of graft polyols and their method of preparation can be found in U.S. Pat. Nos. 3,383,351, 3,304,273, 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185, 3,639,541, and 3,639,542.

Blowing agents which are employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238 which disclosure is herein incorporated by reference.

Other additives may also be included in the foam formulations. Included are surfactants such as the silicone surfactants, e.g., polyoxyalkylene-polyalkylsiloxane, and flame retardants such as tris(2-chloroethyl)-phosphate.

Additional optional catalysts may also be employed. Included are organometallic catalysts such as dibutyltin dilaurate, dibutyltin diacetate, stannous octoate, lead octoate, and cobalt naphthenate; and tertiary amine catalysts such as, triethylenediamine, 1,3,5-tris(3-dimethylaminopropyl)-s-hexahydrotriazine.

Following are specific, non-limiting examples which are provided to illustrate the enumerated principles described herein. All parts are by weight unless otherwise specified.

The test methods employed to determine the density of the foams was ASTM D-1622-23 (1970). The foams were analyzed by infra-red spectroscopy. The foams exhibited isocyanurate and/or urethane linkages.

In the tables below, the following abbreviations are employed:

DC-193[1]—polyoxyethylene-polyalkylsiloxane copolymer surfactant
DPG—dipropylene glycol
EHA—2-ethylhexanoic acid
FREON 11B[2]—monofluorotrichloromethane
FRYOL CEF[3]—tris(2-chloroethyl)phosphate
L-5340[4]—silicone surfactant
MDI—crude methylene diphenyl diisocyanate, a product which results from the phosgenation of an aniline-formaldehyde condensation product and which has an average functionality of from 2 to 3.
PAC—tertiary phosphine, alkylene oxide, and carboxylic acid reaction product
PO—propylene oxide
POLYOL A—polyoxyethylated trimethylolpropane having an average hydroxyl number equivalent weight of 250
POLYOL B—polyoxyethylated toluene diamine having an average hydroxyl number equivalent weight of 126
POLYOL C—polyoxypropylated toluene diamine having an average hydroxyl number equivalent weight of about 145
POLYOL D—polyoxypropylated pentaerythritol having an average hydroxyl number equivalent weight of about 101
TBP—tributylphosphine
[1]manufactured by Dow Corning
[2]manufactured by du Pont
[3]manufactured by Stauffer Chemicals
[4]manufactured by Union Carbide Corporation

EXAMPLE 1

Example 1 illustrates a process employed for the preparation of PAC in accordance with the present invention. Into a reaction flask equipped with a thermometer, dry-ice condenser, mechanical stirrer, addition funnel and a heating mantle, 20.2 parts of TBP was placed. Stirring was commenced and 5.8 parts of propylene oxide was added dropwise over a period of 5 minutes. Upon completing the addition of the propylene oxide, 14.4 parts of EHA dissolved in 20.3 parts of DPG was added drop-wise over a period of 15 minutes with the temperature rising to 52° C. The reaction mixture was then heated to 80° C. and maintained at that temperature for 1 hour. Examination by infra-red spectroscopy disclosed the disappearance of absorption attributable to acid carbonyl and the appearance of absorption attributable to carboxylate groups. Based on spectroscopic analysis, the product is believed to be a 67 percent solution of 2-hydroxypropyltributylphosphonium 2-ethylhexanoate in DPG, was used as such for the preparation of foams.

EXAMPLE 2

In a reaction vessel equipped similar to that described in Example 1, 20.2 parts of TBP was placed. Stirring was commenced and 5.8 parts of propylene oxide was added drop-wise over a period of 7 minutes. Thereafter, a solution of 4.7 parts (97 percent solution, 0.1 mole) of formic acid dissolved in 15.2 parts of DPG was added dropwise over a period of 23 minutes. An exotherm of 85° C. was noted. The reaction contents were cooled to 80° C. and maintained thereat for 7 hours followed by 1 hour at 100° C. Examination of the product at this point in time indicated the disappearance of absorptions attributable to acid carbonyls and appearance of absorptions attributable to carboxylate groups. Based on spectroscopic analysis, the product is believed to be a 67 percent solution of 2-hdyroxypropyltributylphosphonium formate in DPG was used as such for the preparation of foams.

EXAMPLES 3-10

In Examples 3-10, the PAC products of Examples 1 and 2 were evaluated as catalysts for the preparation of foams characterized by isocyanurate and/or urethane linkages. A mixture of MDI and trichlorofluoromethane was prepared in a 1-quart paper container. In a separate vessel, silicone surfactant, polyol and the compounds of the present invention were mixed. The two mixtures were brought together under high speed stirring conditions and allowed to expand in a paper container. The formulations used and the foaming reactivity data are presented in Table I. Examination of the infra-red spectra of the foams indicated the presence of isocyanurate and urethane linkages.

TABLE 1

| Formulation | Examples | | | | | | | |
|---|---|---|---|---|---|---|---|---|
| | 3 | 4 | 5 | 6 | 7 | 8 | 9 | 10 |
| MDI | 100 | 100 | 100 | 100 | 100 | 100 | 100 | 100 |
| FREON ® | 25 | 25 | 25 | 25 | 25 | 25 | 25 | 25 |
| DC-193 | 1 | 1 | 1 | 1 | 1 | 1 | 1 | 1 |
| Catalyst I[a] | 5 | — | 3 | — | 3 | 3 | — | — |
| Catalyst II[b] | — | 5 | — | 3 | — | — | 3 | 3 |
| Polyol A | — | — | 20 | 20 | — | 15 | — | 15 |
| Polyol B | — | — | — | — | 20 | 5 | 20 | 5 |
| Reactivity, sec. | | | | | | | | |
| Cream time | 7 | 7 | 7 | 8 | 10 | 7 | 12 | 10 |
| Gel time (string) | 10 | 10 | 17 | 14 | 18 | 16 | 20 | 16 |
| Rise time | 30 | 21 | 50 | 45 | 47 | 45 | 45 | 43 |
| Tack-free time | 87 | 12 | 190 | 45 | 33 | 100 | 33 | 36 |
| Density, pcf. | 1.7 | 1.4 | — | — | 1.6 | 1.9 | 1.6 | 1.8 |

[a]2-hydroxypropyltributylphosphonium 2-ethylhexanoate as 67 percent solution in DPG as prepared in Example 1.
[b]2-hydroxypropyltributylphosphonium formate as 67 percent solution in DPG as prepared in Example 2.

EXAMPLES 11-12

The activity of the PAC products of Examples 1 and 2 as polyurethane foam catalysts was determined in the following manner:

| Ingredient | Formulation Parts |
|---|---|
| Polyol C | 25.5 |
| Polyol D | 17.0 |
| Catalyst | See table |
| FYROL CEF | 7.5 |
| L-5340 Surfactant | 0.6 |
| MDI | 63.0 |
| FREON 11-B | 16.5 |
| Water | 0.5 |

A blend of Polyol C, Polyol D, distilled water, FYROL CEF, L-5340 and catalyst, hereinafter referred to as stream X, was prepared.

A blend of MDI and FREON 11-B, hereinafter referred to as stream Y, was prepared.

Stream X was added to Stream Y and mixed under high speed for 15 seconds and poured into a container. The foam was allowed to "free-rise". The cream, gel and tackfree times were determined and are shown in Table II below.

TABLE 2

| Catalyst | Example 11<br>I | Example 12<br>II |
|---|---|---|
| Reactivity, sec. | | |
| Amount parts | 1.5 | 1.5 |
| Cream time | 31 | 36 |
| Gel time | 170 | 155 |
| Rise time | 250 | 255 |
| Tack-free time | 315 | 250 |

Catalyst I - 2-hydroxypropyltributylphosphonium 2-ethylhexanoate as 67 percent solution in DPG as prepared in Example 1.
Catalyst II - 2-hydroxypropyltributylphosphonium formate as 67 percent solution in DPG as prepared in Example 2.

The embodiments of the invention in which an exclusive privilege or property is claimed are defined as follows:

1. A process for the preparation of a cellular foam characterized by isocyanurate linkages which comprises reacting an organic polyisocyanate in the presence of a blowing agent and a catalytically sufficient amount of a catalyst which is the reaction product of
   (a) a tertiary phosphine,
   (b) an alkylene oxide containing from 2 to 18 carbon atoms, and
   (c) a carboxylic acid in a ratio of 0.75 mole to 1.25 moles of alkylene oxide to 0.75 equivalent to 1.25 equivalents of acid per equivalent of phosphorus.

2. The process of claim 1 wherein said tertiary phosphine is tributylphosphine.

3. The process of claim 2 wherein said acid is selected from the group consisting of 2-ethylhexanoic acid, acetic acid, and formic acid.

4. The process of claim 3 wherein the alkylene oxide is selected from the group consisting of ethylene oxide and propylene oxide.

5. A process for the preparation of a cellular foam characterized by urethane and/or isocyanurate linkages which comprises reacting one equivalent of an organic polyisocyanate and from 0.01 to 0.5 equivalent of a polyol in the presence of a blowing agent and a catalytically sufficient amount of a catalyst which is the reaction product of
   (a) a tertiary phosphine,
   (b) an alkylene oxide containing from 2 to 18 carbon atoms, and
   (c) a carboxylic acid in a ratio of 0.75 mole to 1.25 moles of alkylene oxide to 0.75 equivalent to 1.25 equivalents of acid per equivalent of phosphorus.

6. The process of claim 5 wherein said tertiary phosphine is tributylphosphine.

7. The process of claim 6 wherein said acid is selected from the group consisting of 2-ethylhexanoic acid, acetic acid, and formic acid.

8. The process of claim 7 wherein the alkylene oxide is selected from the group consisting of ethylene oxide and propylene oxide.

9. A process for the preparation of a cellular foam characterized by polyurethane linkages which comprises reacting an organic polyisocyanate and a polyol, on an essentially 1:1 equivalent basis, in the presence of a blowing agent and a catalytically sufficient amount of a catalyst which is the reaction product of
   (a) a tertiary phosphine,
   (b) an alkylene oxide containing from 2 to 18 carbon atoms, and
   (c) a carboxylic acid in a ratio of 0.27 mole to 1.25 moles of ethylene oxide to 0.75 equivalent to 1.25 equivalents of acid per equivalent of phosphorus.

10. The process of claim 9 wherein said tertiary phosphine is tributylphosphine.

11. The process of claim 10 wherein said acid is selected from the group consisting of 2-ethylhexanoic acid, acetic acid, and formic acid.

12. The process of claim 11 wherein the alkylene oxide is selected from the group consisting of ethylene oxide and propylene oxide.

* * * * *